US006304838B1

(12) United States Patent
Brown

(10) Patent No.: US 6,304,838 B1
(45) Date of Patent: *Oct. 16, 2001

(54) METHODS OF INCREASING POWER HANDLING CAPABILITY OF A POWER LINE

(75) Inventor: Fred A. Brown, Spokane, WA (US)

(73) Assignee: LineSoft Corporation, Spokane, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,297

(22) Filed: Jan. 27, 1998

Related U.S. Application Data

(60) Provisional application No. 60/036,021, filed on Jan. 31, 1997.

(51) Int. Cl.[7] .................................................. G06F 17/50

(52) U.S. Cl. ............................................................ 703/18

(58) Field of Search ......................... 395/500.39, 500.01; 703/18

(56) References Cited

U.S. PATENT DOCUMENTS

| 4,268,818 | 5/1981 | Davis et al. | 340/870.38 |
| 4,420,752 | 12/1983 | Davis et al. | 340/870.17 |
| 4,686,325 | 8/1987 | Marsico et al. | 174/40 |
| 4,806,855 | 2/1989 | Davis | 324/127 |
| 5,235,861 | 8/1993 | Seppa | 73/862.391 |
| 5,517,864 | 5/1996 | Seppa | 73/862.391 |
| 5,574,841 | * 11/1996 | Thompson et al. | 395/500.01 |

OTHER PUBLICATIONS

"Measurement Solutions," Electrical World, vol. 210, No. 6, Jun. 1996.*
"T&D Design Automation," Electrical World, vol. 210, No. 6, Jun. 1996.*
About Optimal. Optimal Systems, Ltd. 1998 [downloaded on Aug. 1, 2000]. Retrieved from URL: <www.optimal.ie/about$_{13}$ page.htm>.*
Product Range. Optimal Systems, Ltd. 1998 [downloaded on Aug. 1, 2000]. Retrieved from URL: 21 www.optimal.ie/product_page.htm>.*
PoleCAD. Optimal Systems, Ltd. 1998 [downloaded on Aug. 1, 2000]. Retrieved from URL: <www.optimal.ie/polecad$_{13}$ page.htm.>.*
CADternary. Optimal Systems, Ltd. 1998 [downloaded on Aug. 1, 2000]. Retrieved fron URL: <www.optimal.ie/span-check_page.htm>.*
PoleLOG. Optimal Systems, Ltd. 1998 [downloaded on Aug. 1, 2000]. Retrieved from URL: <www.optimal.ie/polelog_page.htm>.*

(List continued on next page.)

Primary Examiner—Eric W. Stamber
Assistant Examiner—Kyle J. Choi
(74) Attorney, Agent, or Firm—Wells, St. John, Roberts, Gregory & Matkin, P.S.

(57) ABSTRACT

The present invention includes methods of increasing the power handling capability of a power line. One method of the present invention includes providing a conductor configured to transmit energy intermediate plural locations; supporting the conductor at a plurality of positions intermediate the locations, the supporting at a plurality of positions defining a plurality of spans of the conductor; creating a model of the conductor; identifying a critical span; altering the modelled conductor responsive to the identifying; and analyzing the modelled an conductor following the altering.

23 Claims, 7 Drawing Sheets

OTHER PUBLICATIONS

SpanCheck Overview. Optimal Systems, Ltd. 1998 [downloaded on Aug. 1, 2000]. Retrieved from URL: <www.optimal.ie/spancheck_page.htm>.*

Power Line Systems Dec. 1997 Newsletter. Power Line Systems, Inc. Dec. 1997 [retrieved on Aug. 1, 2000]. Retrieved from URL: <www.powerline.com/dec.97/html>.*

Alcoa Sag10 User's Manual Version 2.0; Alcoa; 1986; pp. 1–135.

Overhead Conductor Manual; Southwire Company; 1994; pp. 1.1–3.22.

Sagsec Manual; Power Line Systems, Inc.; Jan. 1998; pp. 1–37.

PLS–CADD Manual; Power Line Systems, Inc; Sep. 1999; pp. 1–222.

Screen Captures of SAGSEC; 1997; pp. 1–2; (attachments A & B).

Screen Captures of Optimal; 1993;, 1996; pp. 1–2; (attachments C & D).

SAP Manual; Power Line Systems, Inc; Dec. 1997; pp. 1–62.

Three–dimensional cable modeling from Optimal™; http://www.sokkia.com/optimal/cad10tex/index.htm; May 18, 2000, 3 pp.

Overhead Line Design from Optimal™; http://www.sokkia.com/optimal/polecad/index.htm; May 18, 2000; 4 pp.

Optimal™ Spancheck Overview; http://www.sokkia.com/optimal/spancheck/index.htm; May 18, 2000; 4 pp.

Optimal Software; http://www.sokkia.com/optimal/index.htm; May 18, 2000, 3 pp.

SAGSEC—Sags and Tensions in Multi–span Tension Section, Power Line Systems Inc., dated Dec. 5, 1997, pp. 1–2.

True 3–Dimensional Power Line Modeling, Power Line Systems Inc., dated Dec. 5, 1997, pp. 1–3.

* cited by examiner

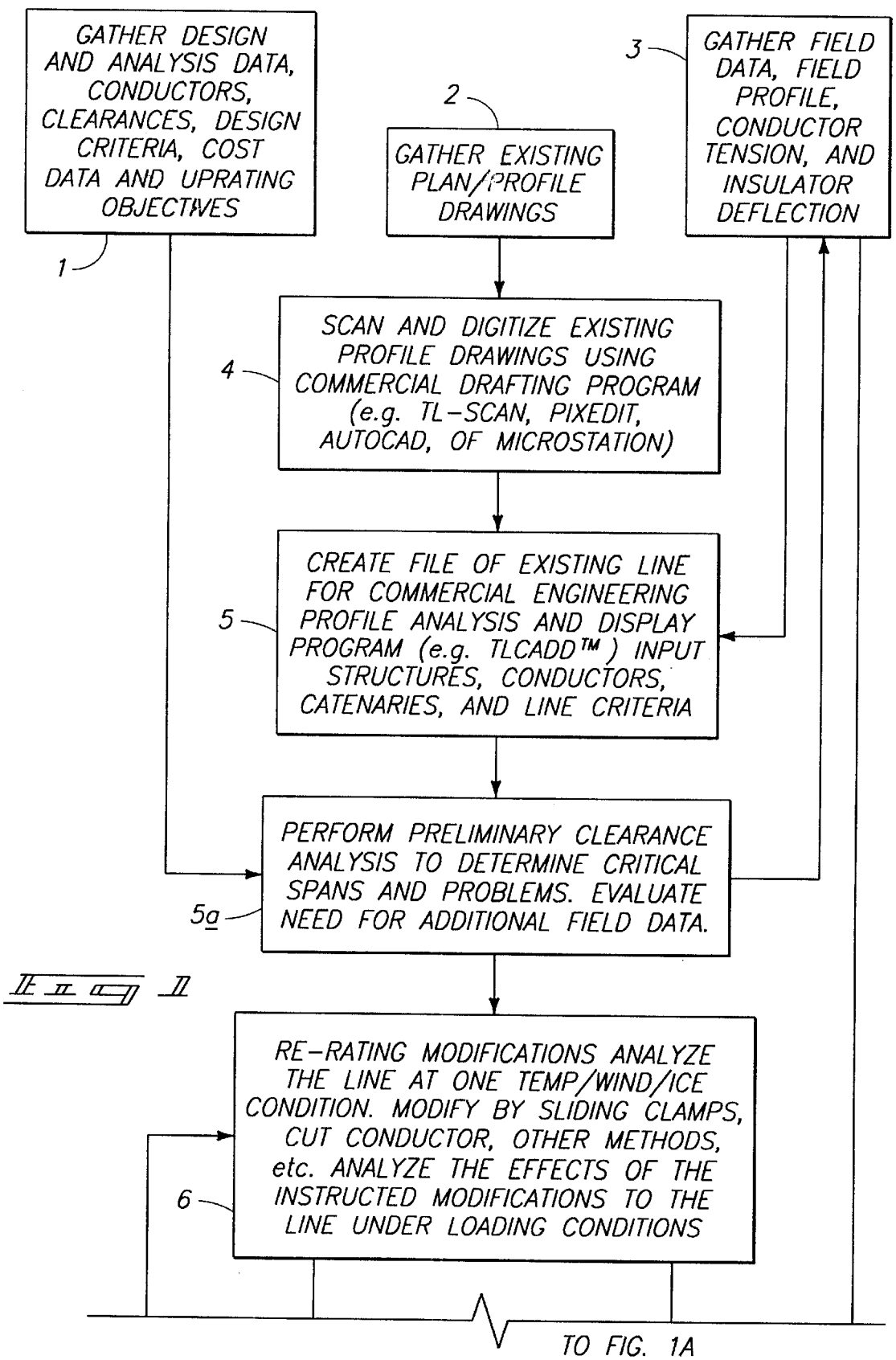

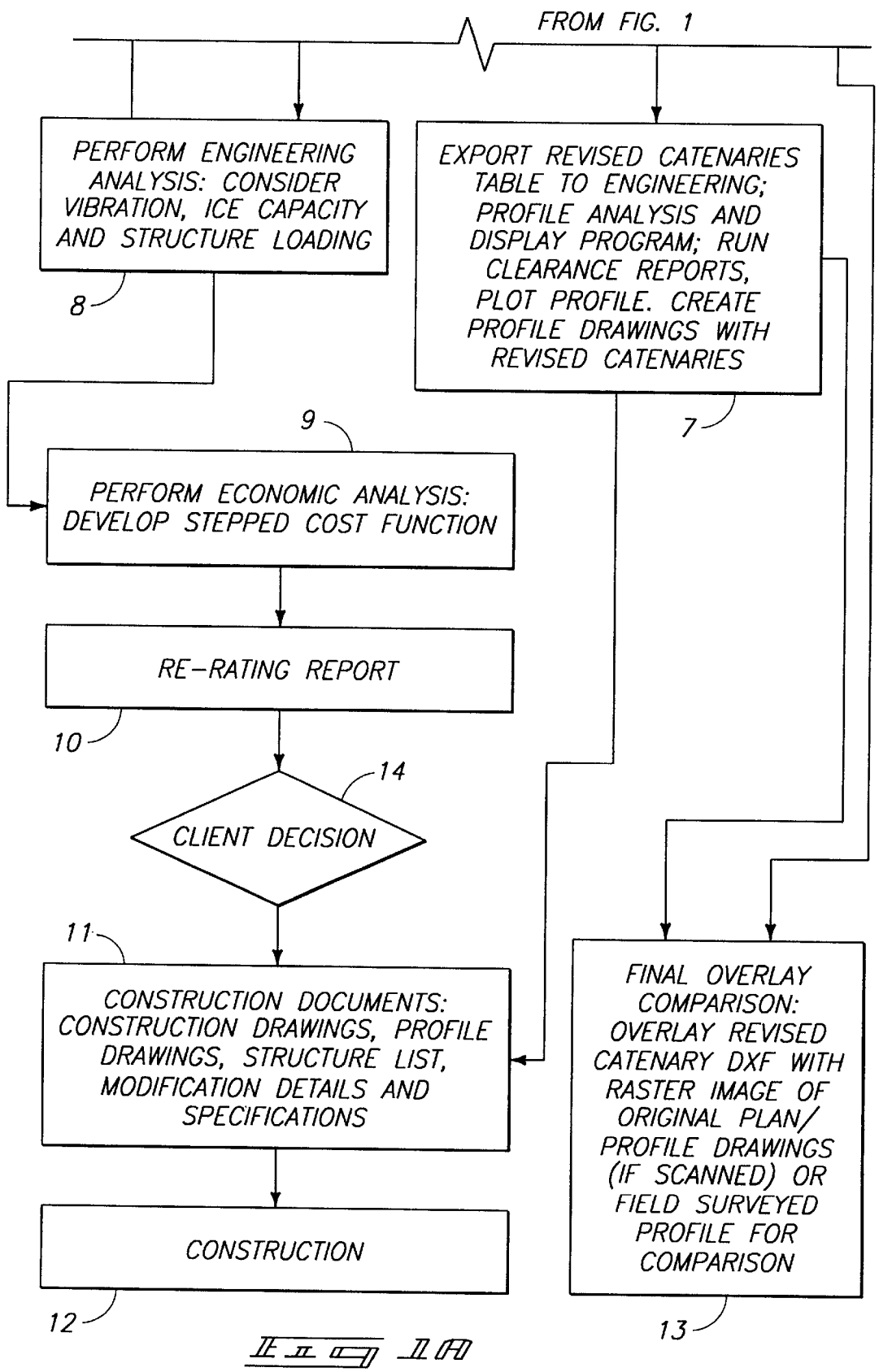

| FIG. 2A | FIG. 2B | FIG. 2C |

Fig. 2

| STATION | STR | LINE ANGLE | SPAN | DEFLECT | SAG | C |
|---|---|---|---|---|---|---|
| BASE CASE 60 DEG. F TENSION = 3400LB. | | | | | | |
| 3707 | 36 | 82.1 | | 0.000 | | |
| | | | 993.0 | | 19.818 | 6219 |
| 4700 | 35 | 0 | | 0.000 | | |
| | | | 775.0 | | 12.071 | 6220 |
| 5475 | 34 | 0 | | 0.000 | | |
| | | | 925.0 | | 17.196 | 6220 |
| 6400 | 33 | 0 | | 0.000 | | |
| | | | 825.0 | | 13.679 | 6220 |
| 7225 | 32 | 0 | | 0.000 | | |
| | | | 875.0 | | 15.387 | 6220 |
| 8100 | 31 | 0 | | 0.000 | | |
| | | | 875.0 | | 15.387 | 6220 |
| 8975 | 30 | 0 | | 0.000 | | |
| | | | 925.0 | | 17.196 | 6220 |
| 9900 | 29 | 0 | | 0.000 | | |
| | | | 925.0 | | 17.196 | 6220 |
| 10825 | 28 | 0 | | 0.000 | | |
| | | | 919.7 | | 17.001 | 6219 |
| 11744.7 | 27 | −11.48 | | 0.000 | | |
| | | | 830.3 | | 13.855 | 6220 |
| 12575 | 26 | 0 | | 0.000 | | |
| | | | 825.0 | | 13.679 | 6219 |
| 13400 | 25 | 0 | | 0.000 | | |
| | | | 675.0 | | 9.157 | 6220 |
| 14075 | 24 | 0 | | 0.000 | | |
| | | | 900.0 | | 16.279 | 6220 |
| 14975 | 23 | 0 | | 0.000 | | |
| | | | 975.0 | | 19.105 | 6220 |
| 15950 | 22 | 0 | | 0.000 | | |
| | | | 750.0 | | 11.305 | 6220 |
| 16700 | 21 | 0 | | 0.000 | | |
| | | | 1000.0 | | 20.098 | 6220 |

FIG. 2A

| TRIAL A REMOVAL | TRIAL A SHIFT | TRIAL A DEFLECT | TRIAL A SAG | TRIAL A C |
|---|---|---|---|---|
| | | TRIAL A 212 DEG. F | | |
| | | 0.000 | | |
| | | | 31.434 | 3919 |
| | | −0.245 | | |
| | | | 19.445 | 3863 |
| | | 0.003 | | |
| | | | 27.675 | 3864 |
| | | −0.099 | | |
| | | | 22.153 | 3842 |
| | | 0.033 | | |
| | | | 24.873 | 3848 |
| | | 0.052 | | |
| | | | 24.814 | 3857 |
| | | 0.081 | | |
| | | | 27.607 | 3873 |
| | | −0.010 | | |
| | | | 27.634 | 3870 |
| | | −0.104 | | |
| | | | 27.499 | 3844 |
| | | −0.213 | | |
| | | | 22.676 | 3801 |
| | | −0.130 | | |
| | | | 22.554 | 3773 |
| | | −0.062 | | |
| | | | 15.154 | 3762 |
| | | 0.267 | | |
| | | | 26.555 | 3812 |
| | | 0.177 | | |
| | | | 30.833 | 3852 |
| | | −0.104 | | |
| | | | 18.366 | 3831 |
| | | 0.163 | | |
| | | | 32.300 | 3867 |

FIG. 2B

| TRIAL B REMOVAL | TRIAL B SHIFT | TRIAL B DEFLECT | TRIAL B SAG | TRIAL B C |
|---|---|---|---|---|
| | TRIAL B 212 DEG. F W/N&T | | | |
| | | 0 | 0.000 | |
| 0 | | | 29.940 | 4115 |
| | −0.25 | −0.229 | | |
| 0 | | | 18.512 | 4062 |
| | 0 | 0.411 | | |
| 1 | | | 25.781 | 4141 |
| | 0 | −0.374 | | |
| 0 | | | 21.008 | 4058 |
| | 0.5 | 0.442 | | |
| 0 | | | 23.066 | 4147 |
| | 0 | 0.253 | | |
| 0 | | | 22.797 | 4199 |
| 1 | −0.25 | 0.359 | | |
| 1.75 | | | 24.968 | 4275 |
| | 0.25 | −0.544 | | |
| 0 | | | 25.817 | 4147 |
| | 0.5 | −0.079 | | |
| 0 | | | 25.598 | 4128 |
| | 0 | −0.368 | | |
| 0 | | | 21.279 | 4053 |
| | 0 | −0.064 | | |
| 0 | | | 21.078 | 4039 |
| | 0 | 0.239 | | |
| 0 | | | 13.972 | 4082 |
| | 0 | 0.728 | | |
| 0 | | | 24.013 | 4217 |
| 2 | −0.25 | 0.810 | | |
| 2.25 | | | 26.920 | 4400 |
| | 0 | −0.800 | | |
| 0 | | | 16.638 | 4232 |
| | 0 | −0.283 | | |
| 0 | | | 29.970 | 4171 |

Fig. 2C

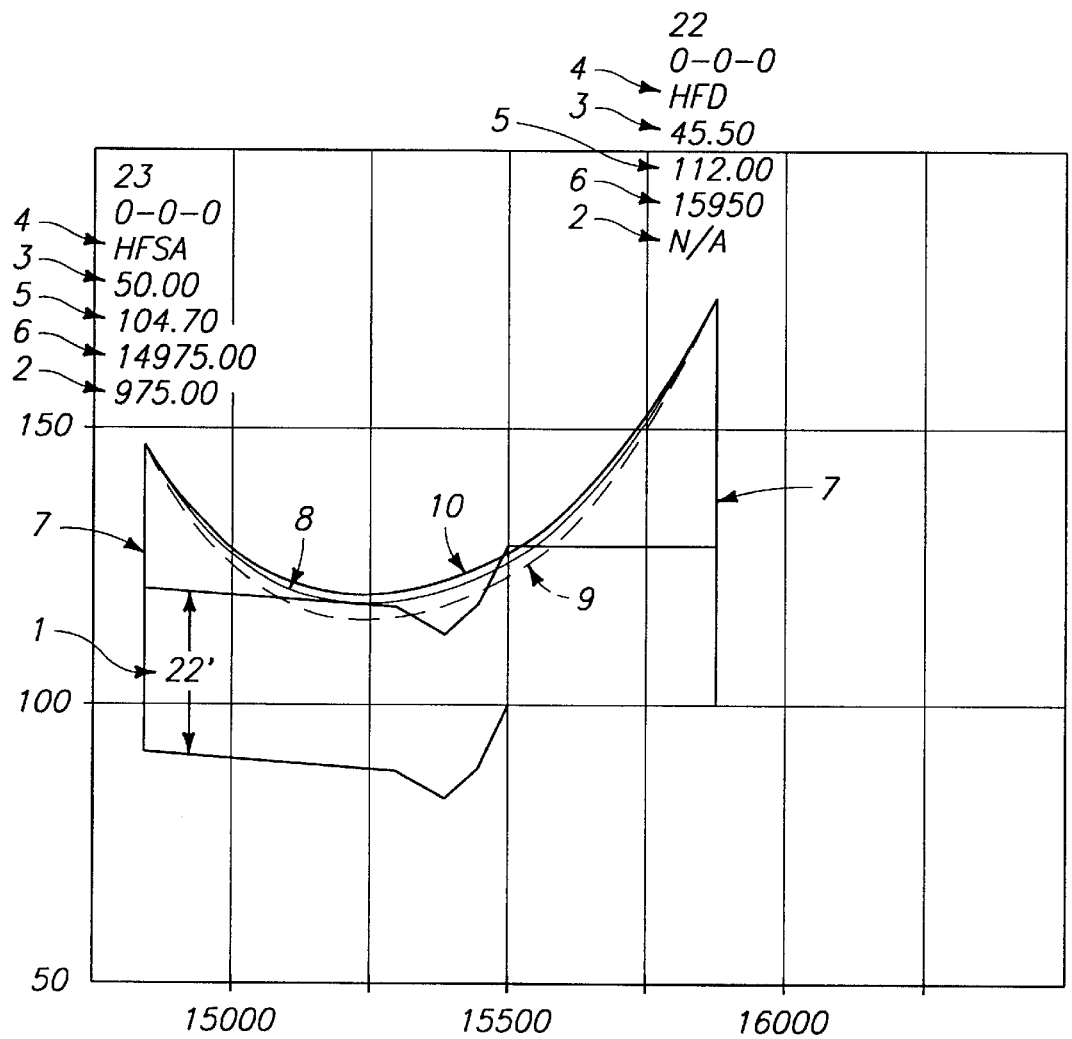

METHODS OF INCREASING POWER HANDLING CAPABILITY OF A POWER LINE

CROSS REFERENCE TO RELATED APPLICATIONS

This application claims priority from U.S. Provisional application 60/036,021, filed Jan. 31, 1997, titled "Nip and Tuck Power Line Rerating Process", and incorporated herein by reference.

TECHNICAL FIELD

This invention relates to electrical power line re-rating of overhead conductors using one or more of two possible modifications not previously used for this purpose: removing small lengths of conductor, and repositioning conductor support clamps. More particularly, this is a process of determining and making the least cost adjustments to the conductor system of a particular, existing overhead electrical power line so as to allow the conductors in that line to operate at a higher temperature than currently rated without violating safety codes, safety clearances or design standards criteria for conductor sag and tension using these possible modifications, separately or in combination with each other. The intent of these modifications is to selectively increase the tension in the conductor so as to eliminate clearance violations caused by an increase in the sag of the conductor resulting from an increase in the power transfer capability of the electrical power line.

BACKGROUND OF THE INVENTION

Electrical power line owners have a desire and need to transmit more power over existing power lines. As the amount of power being transmitted over a given line (conductor) increases, the temperature of the conductor increases. As the temperature of the conductor increases, the sag of the conductor increases. Existing weather conditions, conductor installation conditions and structural characteristics of the line also affect the amount of sag. Excess sag can put the conductor so close to objects on the earth as to cause flashover, which can damage the line and nearby facilities, cause power outages and endanger animal and plant life.

The current method for line re-rating is to combine sag and tension calculations with any one of a number of commercially available power line analysis computer programs, including longitudinal loading models, to calculate the maximum amperage or conductor temperature that can be used for that line which will not violate safety codes or clearance criteria, nor cause structural or conductor damage. If the desired or required conductor temperature cannot be achieved with the existing design, then the power line owner must resort to one or more of the standard current methods of eliminating the clearance violations. These standard methods include: re-conductoring, raising existing structures, re-tensioning the line between dead end sections, or inserting additional structures. The re-rating process may or may not include field verification of the physical parameters of the power line.

Inherent in any power line rating or re-rating process is the need to determine the behavior of the whole power line and individual conductors operating at higher temperatures. The behavior (sag) of the conductors at high temperatures is generally determined by computer programs, such as Alcoa's SAG10, that calculate the tension and corresponding sag of the conductor based on input of environmental parameters, conductor creep, temperature ranges and other factors. SAG10 is generally available and commonly used within the industry.

The behavior of the power line at high temperatures is determined by a longitudinal loading model. Longitudinal loading models calculate the position of the wire after a change in temperature or loading has occurred. The calculations in these models are based upon the length of wire in a span being fixed at a point in time with known environmental conditions (e.g., ambient temperature) and known geometry and physical characteristics (e.g., longitudinal movement of the conductor supports (insulators), type of conductor support, flexibility of the structures, relative elevation of conductor supports and the spans between structures). As the temperature or loading of the wire changes, the length of wire in that span changes based upon the geometry of the span and the physical properties of the wire, such as coefficient of thermal expansion and creep.

Presently, several procedures exist, used individually or in combination, to predict how much power can be transmitted over an existing power line, under given environmental conditions, without violating safety codes or design standards.

1. The Institute of Electrical and Electronics Engineers (IEEE), Electrical Power Research Institute (EPRI) and Power Technologies Inc. (PTI) and others, have developed and modified computer programs which calculate the electrical capacity (rating) of a power line based upon thermodynamics and heat transfer physics. These programs use environmental parameters, such as wind speed, wind direction, ambient temperature, solar radiation and line direction to calculate allowable amperage of a line. "Worst case" environmental parameters are established and the power line rating is calculated. These programs, used in combination with a longitudinal load model or power line analysis program establish the maximum amperage (or conductor temperature) at which the line can be operated without violating clearance criteria or damaging the conductor(s). Exceeding this upper bound will very likely cause clearance violations, damage the conductor, or both. The mathematical formulas found in the power line rating programs are generally accepted within the industry.

2. Devices can be installed on the line to monitor the tension in the conductor. Conductor tension is combined with other environmental data, such as the ambient temperature and solar radiation, to predict the rating or electrical capacity of the line. U.S. Pat. Nos. 5,517,864 and 5,235,861, both by Tapani O. Seppa (and other patents noted therein), relate to methods of calculating the approximate actual sag of an overhead power transmission line by measuring the amount of tension on the line either by tensiometers or swing angle indicators, as well as measuring ambient temperature, both done at two different times, with no power flow, and then remotely transmitting that information to a computer for performance of calculations. From the data received, a Ruling Span can be calculated from which to determine a maximum safe current that can be transmitted by the existing line without creating excess conductor sag.

3. Israel Electric Company, Haifa, Israel has occasionally used selected algorithms to approximate actual sag under certain combinations of conditions of weather, power transmission and physical design; using basic longitudinal load modeling techniques.

4. Power Line Systems, Inc. is understood to have a computer program (SagSec Software by Peyrot of Power Line Systems, Inc. of Madison, Wis.) that performs a mathematical analysis of sag and tension, using longitudinal load modeling, including allowance for longitudinal insulator movement.

5. Multiple power line analysis, pole/tower spotting optimization, profile analysis and display computer programs exist, including TLCADD™, PLSCADD, and Optimal. These computer programs are primarily used in the power line rating process to calculate clearance to the conductors.

6. Current methods to increase the amount of power transmitted over a given line generally require taking the line out of service to make extensive modifications to the conductors or structures, or both. An existing conductor can be replaced with a larger conductor to allow the electrical line to carry an increased load. Alternatively, structures in the existing line can be raised or replaced to allow for the increased sag of the existing conductor when carrying the higher electrical load. Also, new structures can be installed between existing structures to eliminate the low clearance areas caused by increased conductor sag.

The procedures of removing small lengths of conductor and of sliding support clamps have been used in other contexts, but have not been considered for the purpose of re-rating of power lines, as analysis, tools and procedures have not been available to perform the complex calculations needed to determine where to make such removals or slide such clamps.

BRIEF DESCRIPTION OF THE DRAWINGS

Preferred embodiments of the invention are described below with reference to the following accompanying drawings.

FIGS. 1, 1A are a logical flow chart of the re-rating process.

FIG. 2 is a graph illustrating how FIGS. 2A–2C are assembled.

FIGS. 2A–2C are a sample of the computer written output showing where along the line a portion of a conductor should be removed, and how much and in which direction to slip the support clamps.

FIG. 3 is a sample of the computer graphic output showing the sag of the conductor under various conditions analyzed.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The purpose of this invention is to analyze, redesign and field modify an existing electrical power line such that it will be able to carry more power without violating clearance criteria, and without necessarily having to change out the conductor, alter the structures or de-energize the line (where energized line work is permissible and economically advantageous), using the following two procedures, separately or in combination with each other, to eliminate the clearance violation:

1. Removing a length of conductor in the span with the clearance violation, or in adjacent spans;
2. Adjusting the conductor support clamps on structure(s) adjacent to or in the vicinity of the clearance violation.

In particular, this process includes:

1. A determination of whether removal of a portion of the conductor is possible, and if so, how much and where to make such removals;
2. A determination of whether adjusting the conductor support clamps is possible, and if so, where and how much to move the support clamps;
3. Estimations of the costs of making these adjustments and modifications, as well as the costs of using standard procedures now in practice;
4. A recommendation of the best combination of conductor temperature, modification procedure and associated costs; and
5. Performing the actual modifications recommended.

Data is gathered (FIG. 1: Items 1, 2, and 3) from original design documentation and drawings, industry standards and field records. This data includes:

1. (FIG. 1:1) Meteorological conditions to be considered, especially: temperature ranges; wind velocities and directions;
   and anticipated ice loadings;
2. (FIG. 1:1) Clearance requirements, especially: above ground (FIG. 3:1); from edge of right-of-way; over special areas such as railroads, roadways, and fences;
3. (FIG. 1:1) Cost elements, especially: labor; construction equipment; structures and parts thereof; conductors; insulators; time to do certain types of tasks associated with re-rating lines; opportunity costs if the line must be de-energized to make alterations;
4. (FIG. 1:1) Conductor characteristics, especially: size; tensile strength; creep and stress characteristics over time and at various temperatures, including field measured unbalanced tensions; types and sizes of clamps needed;
5. (FIG. 1:3) Structure characteristics, especially: spacing between (FIG. 3:2); distances from edges of right-of-way; heights; weight bearing capacities (FIG. 3:4); flexibility (FIG. 3:4); insulator type, dimensions, length, swing, strength and field measured actual positions (FIG. 3:4); dead-end locations; angle locations and actual line angles; attachment heights (FIG. 3:3);
6. Terrain over which the line passes, especially: elevation (FIG. 3:5); width of right-of-way; and special features.

Profile drawings are scanned and digitized using commercially available drafting programs (FIG. 1:4).

All of the data collected is loaded into complete, formatted databases for use in, and as required by, commercially available engineering profile analysis and display programs, such as TLCADD (FIG. 1:5). This data is used for the following calculations.

From the data collected, and using a longitudinal loading model, a preliminary analysis of the power line is performed to evaluate the quality of data collected and identify the problem spans (FIG. 1:5A). Based upon the preliminary evaluation, a detailed visual inspection and detailed survey may be undertaken (FIG. 1:3) to improve the quality of the input data and analysis.

Structural analysis is made of all structures to determine maximum strength and flexibility, using standard, commercially available structural analysis programs, such as STAAD-III, by Research Engineers, Inc.

Conductors are analyzed to determine maximum available strength, sag and creep characteristics, using standard, commercially available conductor sag and tension analysis programs, such as Alcoa's "SAG10".

A best fit, or "Base Case", computer model of the line is developed to accommodate all the existing data of the line section. This includes plan and profile data, adjusted by field surveys of spans, sags, significant insulator offsets and pole deflections all at the base case temperature.

A "Trial A" is then calculated using a longitudinal loading model analysis (FIG. 1:6). This base case shows what would happen to the conductors if operated at the maximum desired operating temperatures without modification. The multiple-iteration analysis is calculated on a span-by-span basis, considering: span length, weight span, catenaries in each span, insulator swing, insulator weight and stiffness, all to analyze the line under very high temperature (VHT) conditions without the errors introduced by the standard Ruling Span concept.

In this process, the catenary shapes of the wire in each span must be accurately determined for various conductor conditions, such as maximum desired temperature, and wind and ice loadings of the line under normal conditions. This is done through multiple iterations of the calculations in the longitudinal loading model.

From such analysis, clearance violations are identified on an individual span by span basis. This is generally done with a commercially available power line analysis spotting optimization program, such as TLCADD, taking into account the movement of insulator strings and individual structure stiffness.

Also as part of this process (FIG. 1:6), the critical spans (spans with clearance violations) created by higher conductor operating temperatures are noted. The nature and severity of each clearance violation is noted.

a) This invention considers two methods for eliminating the clearance violation in the critical spans, which methods have not previously been used for this purpose. Each of these methods are considered and the resultant line characteristics, on a span-by-span basis, are determined; again, through multiple iterations of the longitudinal loading model. While hand calculations are possible, use of a computer program or other automated procedure will greatly assist the designer with these multiple iteration calculations. It is necessary to analyze each span separately, considering a virtually infinite number of combinations of how much and where to either cut out pieces of the conductor, or to slide the clamps, or some combination of both, over a several span section of the system.

b) Each span must be separately analyzed in order to overcome the errors inherent in the commonly used "Ruling Span" concept. With a change in the length of the wire, there is a corresponding change in the wire tension. To achieve equilibrium at the conductor support points at either end of the span, the insulators and, to a lesser degree, the structures, move to balance the forces in the adjacent spans. The formulae for calculating the change in the length of the wire and the corresponding change in tension are commonly available within the industry; see, for example, Southwire Company, *Overhead Conductor Manual*, First Edition, 1994.

c) The movement of the insulators is determined by resolving the forces in a static equilibrium calculation. Since the movement of each insulator is affected by the adjacent spans, mathematically determining the equilibrium points of a multi-span wire system requires multiple calculations in an iterative process. Wire systems larger than two to four spans may require hundreds of calculations in multiple iterations. The availability of commercially available computer programs, such as "SagSec" (by PLS) or "Nip & Tuck" (by ECSI), will speed the calculation process to the point of practicality.

d) Removing a small piece of the conductor increases the tension, which will cause the insulators to move so that equilibrium at the insulator is maintained. Since this insulator movement affects the tension in the adjacent spans, an iterative solution is required to find what the equilibrium point is for each of the affected spans. A similar process occurs when the position of the support clamps is changed. By, doing so, the length of wire in two spans are changed, which changes the tension in at least three spans, which will cause the insulators on each end of the spans affected to move to new equilibrium positions. Again, for a multi-span line section, this will require multiple iterations.

In performing these analyses, the designer considers:
1. the initial position of the insulators and conductor;
2. the change in tension in the conductor at each span;
3. the position on the conductor where the support clamps should be reattached;
4. vibration limits on the line and structures (FIG. 1:8);
5. maximum tension capabilities of all components (FIG. 1:8);
6. flexibility of the structures;
7. insulator swing at each structure (FIG. 1:8);
8. resultant load applied to each structure (FIG. 1:8); and
9. the resultant actual catenaries at various temperature and conductor loadings (FIG. 1:7)

The designer will need to use best practice as judgment to determine the true practical feasibility of the recommendations from the first analysis, for removal of pieces of the conductor and movement of clamps at various structure locations, and develop an optimal solution.

Figures 2, 2A:
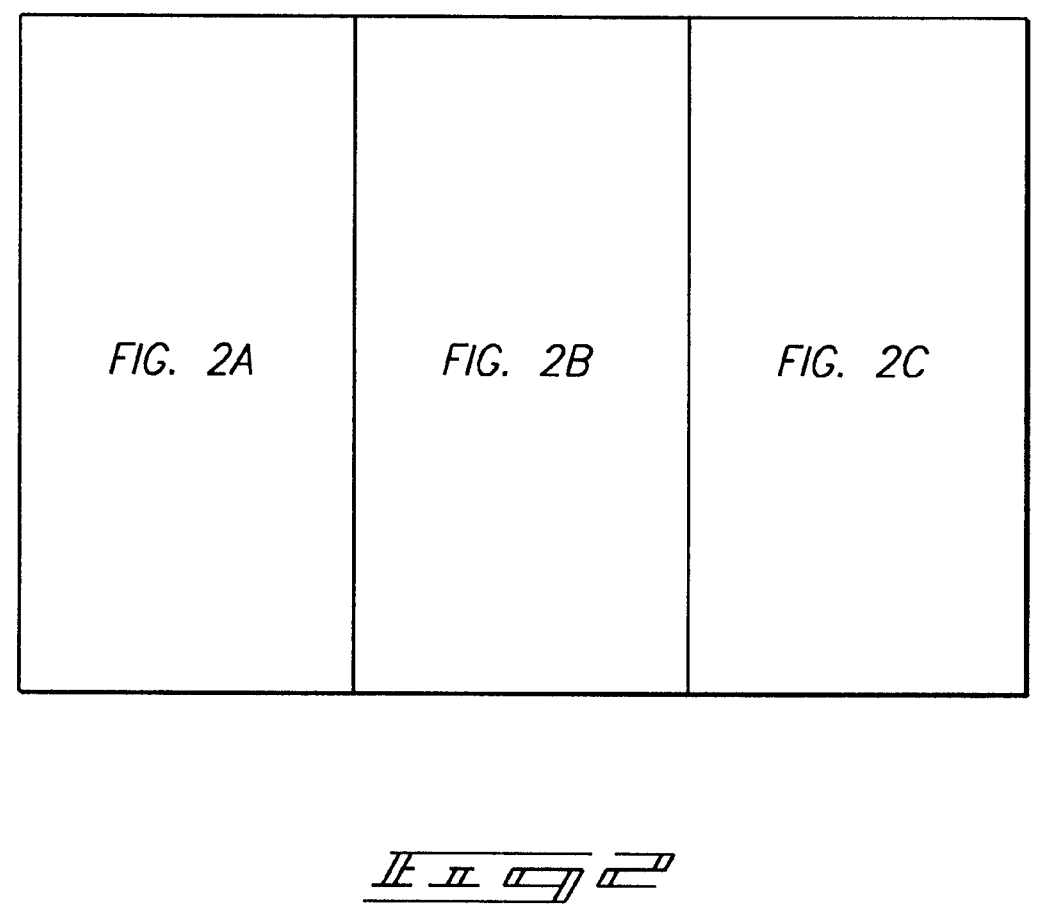

A display of the results might look like FIG. 2. In this example, the "Trial B" section indicates a need to remove 1.75 feet between 29 and 30 (FIG. 2:1) and a removal of 2.25 feet between structures 22 and 23 (FIG. 2:2). Trial B also recommends a movement of the clamp at structure 30 backwards by 0.25 feet (FIG. 2:3), and movement of the clamps at structure 29 ahead 0.25 feet (FIG. 2:4), as well as a backwards movement of the clamp at structure 23 by 0.25 feet (FIG. 2:5).

"Trial B" is used to verify the sag clearances and insulator deflections at the preferred very high temperature (VHT) operation assuming the corrections introduced, as reflected in the Trial B columns marked "Removal" (FIG. 2:6) and "Shift" (FIG. 2:7). As there are potentially an unlimited number of different options regarding the application of the procedures, this "Trial B," may be repeated several times to optimize the cost and find feasible solutions on a difficult section of line. The optimization is usually focused on minimizing the number of field operations, that is minimizing the number of pieces of the conductor to remove and the number of clamp movements. Such things as insulator deflection, longitudinal loading, conductor vibration, uplift, construction access, construct-ability, and energized versus de-energized must also be considered and evaluated by the engineer (FIG. 1:8).

The cost of these procedures, used separately or in conjunction with each other, is calculated and compared to the costs for the standard alternatives (FIG. 1:9).

Using standard engineering procedures, construction estimates are prepared for various standard design modification alternatives (FIG. 1:9). The engineer should include such other standard modification possibilities as:

1. Putting in all new conductor with more power transmission ability; including replacement of components not currently capable of bearing the additional stresses imposed by new conductor. These components may include poles/towers, crossarms, braces, bolts, insulators and other structural components;
2. Increasing the height of some structures;
3. Increasing the number of structures;
4. Re-sagging: putting the whole line or line segment, from dead end to dead end, in sheaves, pulling it tighter at a fixed location, allowing the line to seek its own sag 'level', then re-clamping; and
5. Attempting to do some or all of the field modifications with the power line energized.

In the event the costs of all alternatives are higher than allowable, a recommendation of a lower operating temperature, with calculations made of how much the line could be altered, under the lowest cost alternative, and a determination is made of how much the operating temperature of the conductor could be increased given that level of alteration (FIG. 1:9).

FIG. 3 is an example of a graphic output from a commercially available computerized longitudinal loading analysis program showing, in this case, two structures (FIG. 3:7), their station numbers or distance along the line (FIG. 3:6), the sag in the conductor at normal maximum operating temperature and conditions (FIG. 3:8), the expected sag in the line if operated at maximum desired temperature without modification (FIG. 3:9), and the sag in the line at the higher operating temperature desired and after the determined optimal modification (FIG. 3:10). This is the image that would be used as the final overlay in comparison (FIG. 1:13).

Once a preferred field modification plan is determined, and client approval obtained (FIG. 1:14), then construction drawings and specifications are prepared (FIG. 1:11). A report is prepared for the construction forces (FIG. 1:10). This describes, in order, precisely where and how much conductor to remove and which clamps to move, how far and which direction.

The power line conductor(s) is then physically altered by making the cuts and resetting the clamps as prescribed by the process. The actual field modifications to the conductor are an integral part of the invention as the construction process is only possible with the invention's detailed construction specifications (FIG. 1:12). Standard construction techniques would be used for the actual cutting and splicing of the conductors, and the loosening, sliding and tightening of clamps.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of analyzing a power line to increase the power handling capability of the power line comprising:

providing data of a conductor, a plurality of supports, and swing information of a plurality of insulators intermediate the conductor and respective ones of the supports of an existing power line configured to transmit electrical energy, the existing power line being configured according to initial design parameters;

providing a first model of the existing power line configured according to the initial design parameters using the data, the first model including the swing information of the insulators;

analyzing the first model of the existing power line at an increased operating condition to identify a violation of the conductor responsive to the increased operating condition; and responsive to the analyzing, altering the initial design parameters to provide a second model of the existing power line configured according to modified design parameters different than the initial design parameters to provide a design having increased power handling capability of the conductor, the second model including swing information of the insulators different than the swing information of the first model.

2. The method according to claim 1 wherein the providing data comprises providing data of the existing power line configured according to the initial design parameters comprising a location of at least one clamp relative to the conductor, and wherein the altering comprises altering the position of the at least one clamp relative to the conductor.

3. The method according to claim 2 wherein the altering the position comprises altering to avoid at least one of a clearance violation and a swing violation.

4. The method according to claim 1 wherein the altering comprises removing a portion of the conductor.

5. The method according to claim 1 wherein the providing the first model comprises analyzing the position of insulators relative to the conductor to resolve forces exerted upon the insulators in a static equilibrium state to determine equilibrium points of a plural span system.

6. The method according to claim 1 wherein the providing the first model comprises analyzing movement of insulators coupled with the conductor and stiffness of individual supports.

7. The method according to claim 1 wherein the providing data comprises providing data of a plurality of spans of the existing power line, and the altering comprises altering individual ones of the spans.

8. The method according to claim 1 wherein the providing data comprises providing data of a plurality of spans of the existing power line, and the providing the first model comprises providing equilibrium points for the spans.

9. The method according to claim 1 wherein the providing data comprises providing data of a plurality of spans of the existing power line, and the altering comprises altering a span having a violation.

10. The method according to claim 1 wherein the providing data comprises providing data of a plurality of spans of the existing power line, and the altering comprises altering a span adjacent to another span having a violation.

11. The method according to claim 10 wherein the altering comprises altering the span adjacent the another span having a tension violation.

12. The method according to claim 1 wherein the providing the first model comprises providing without use of the Ruling Span concept.

13. The method according to claim 1 wherein the providing data comprises providing data of the existing power line according to initial design parameters comprising original design parameters.

14. The method according to claim 1 wherein the providing data comprises providing data of the existing power line using survey information obtained from the existing power line in the field.

15. The method according to claim 1 further comprising analyzing the second model of the existing power line at an increased operation condition.

16. The method according to claim 1 further comprising analyzing the second model including the swing information of the insulators with respect to current safety code.

17. The method according to claim 1 wherein the providing data comprises providing data including a plurality of different tensions of the conductor in a plurality of respective spans.

18. The method according to claim 17 wherein the providing the first model comprises providing the first model including different tensions of the conductor using the data and the altering comprises altering to provide the second model including tensions of the conductor different than the tensions of the first model.

19. The method according to claim 1 further comprising identifying a portion of the conductor after the analyzing and the altering comprises removing the portion conductor.

20. The method according to claim 1 further comprising verifying the second model including the swing information of the insulators against clearances.

21. A method of analyzing a power line to increase the power handling capability of the power line comprising:

providing data of an existing power line configured to transmit electrical energy, the existing power line being configured according to initial design parameters and comprising a conductor coupled with a plurality of insulators and supported by a plurality of supports defining a plurality of spans, the data including swing information of the insulators;

providing a first model of the existing power line configured according to the initial design parameters using the data, the providing the first model comprising providing the first model including swing information of the insulators;

analyzing the first model of the existing power line at an increased operating condition to identify a violation of the conductor responsive to the increased operating condition;

responsive to the analyzing, altering the initial design parameters to provide a second model of the existing power line including swing information of the insulators and configured according to modified design parameters different than the initial design parameters to provide a design having increased power handling capability of the conductor, wherein the altering comprises at least one of adjusting a location of clamp relative to the conductor and removing a portion of the conductor; and analyzing the second model of the existing power line at an increased operating condition.

22. The method according to claim 21 wherein the providing data comprises providing data of the existing power line according to initial design parameters comprising original design parameters.

23. An article of manufacture comprising:

a computer usable medium having computer useable code embodied therein and configured to cause a processor to perform steps comprising:

receiving data of a conductor, a plurality of supports, and swing information of a plurality of insulators intermediate the conductor and respective ones of the supports of an existing power line configured to transmit electrical energy, the existing power line being configured according to initial design parameters;

providing a first model of the existing power line configured according to the initial design parameters using the data, the first model including the swing information of the insulators;

analyzing the first model of the existing power line at an increased operating condition to identify a violation of the conductor responsive to the increased operating condition; and responsive to the analyzing, altering the initial design parameters to provide a second model of the existing power line configured according to modified design parameters different than the initial design parameters to provide a design having increased power handling capability of the conductor, the second model including swing information of the insulators different than the swing information of the first model.

* * * * *

UNITED STATES PATENT AND TRADEMARK OFFICE
CERTIFICATE OF CORRECTION

PATENT NO. : 6,304,838 B1
DATED : October 16, 2001
INVENTOR(S) : Fred A. Browne

Page 1 of 1

It is certified that error appears in the above-identified patent and that said Letters Patent is hereby corrected as shown below:

<u>Title page,</u>
ABSTRACT, last line, please delete "an" after modelled.
Last line please delete "modelled" and insert -- modeled --.

<u>Column 9,</u>
Line 21, please insert -- wherein -- before the first "the".
Line 21, please insert -- of the -- after "portion".

Signed and Sealed this

Twenty-first Day of May, 2002

Attest:

Attesting Officer

JAMES E. ROGAN
*Director of the United States Patent and Trademark Office*